United States Patent [19]

King

[11] 3,731,389
[45] May 8, 1973

[54] TAPE MEASURING DEVICE

[76] Inventor: Bernard King, 130 Madison Avenue, New York, N.Y. 10016

[22] Filed: May 7, 1970

[21] Appl. No.: 35,391

[52] U.S. Cl. ..................... 33/189, 33/27 C, 33/138
[51] Int. Cl. .............................................. B43l 9/04
[58] Field of Search ..................... 33/27 C, 138, 139, 33/140, 189

[56] References Cited

UNITED STATES PATENTS

| | | | |
|---|---|---|---|
| 3,534,478 | 10/1970 | Fisher | 33/138 |
| 2,581,858 | 1/1952 | Hilt et al. | 33/27 C |
| 3,577,641 | 5/1971 | Smith | 33/138 |
| 2,624,120 | 1/1953 | Mills | 33/189 X |
| 3,255,531 | 6/1966 | Anderson | 33/138 |
| 3,120,059 | 2/1964 | Quinot | 33/138 X |
| 3,494,038 | 2/1970 | Quenot | 33/138 |
| 3,004,346 | 10/1901 | Quenot | 33/138 |

FOREIGN PATENTS OR APPLICATIONS

| | | | |
|---|---|---|---|
| 1,421,403 | 11/1965 | France | 33/138 |

*Primary Examiner*—Harry N. Haroian
*Attorney*—Robert E. Burns and Emmanuel J. Lobato

[57] ABSTRACT

Disclosed herein is a tape measuring device comprising a measuring tape coiled within a casing, and having a spring actuated return device for recoiling the tape when it has been withdrawn from the casing. A brake device is spring loaded within the casing to counter balance the return force so that the measuring tape will remain withdrawn until the brake is released to permit the return device to re-coil the tape. The brake device includes a U-shaped member having fingers projecting inwardly in a face-to-face manner from the free ends of the U-shaped member for pressing the tape against an internal wall of the casing under the force of a coil spring disposed between the casing and inner face of the bight portion of the U-shaped member. The tape measuring device also comprises a marking mechanism, disposed within the casing at the ends thereof opposite the end at which the tape is withdrawn, and including a marking element which is spring biased upwardly, but which may be depressed to place a mark on the surface being measured. The indicia on the tape are read through a window in the top of the casing, and the reading is arranged to correspond exactly with the distance between the marking element and the free end of the tape.

13 Claims, 5 Drawing Figures

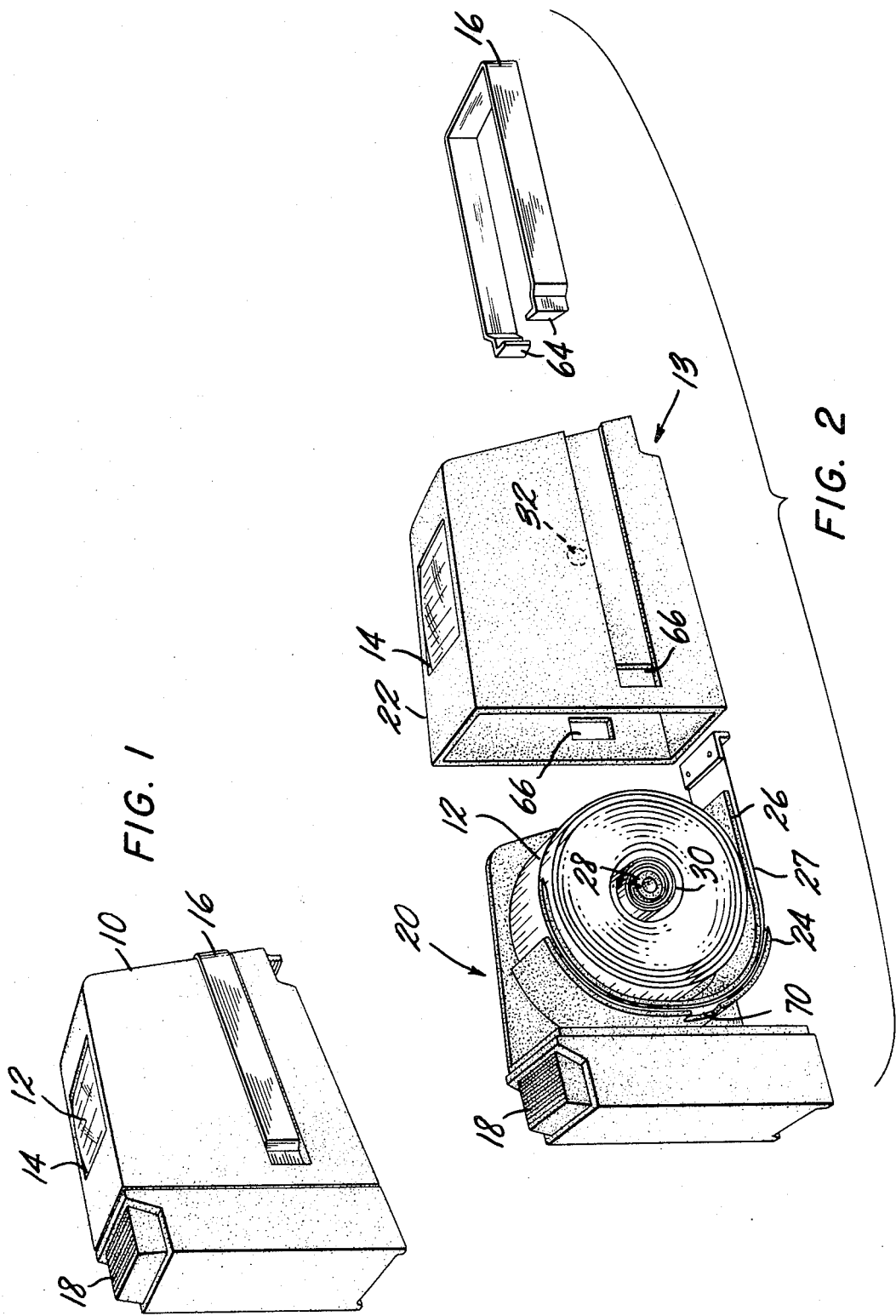

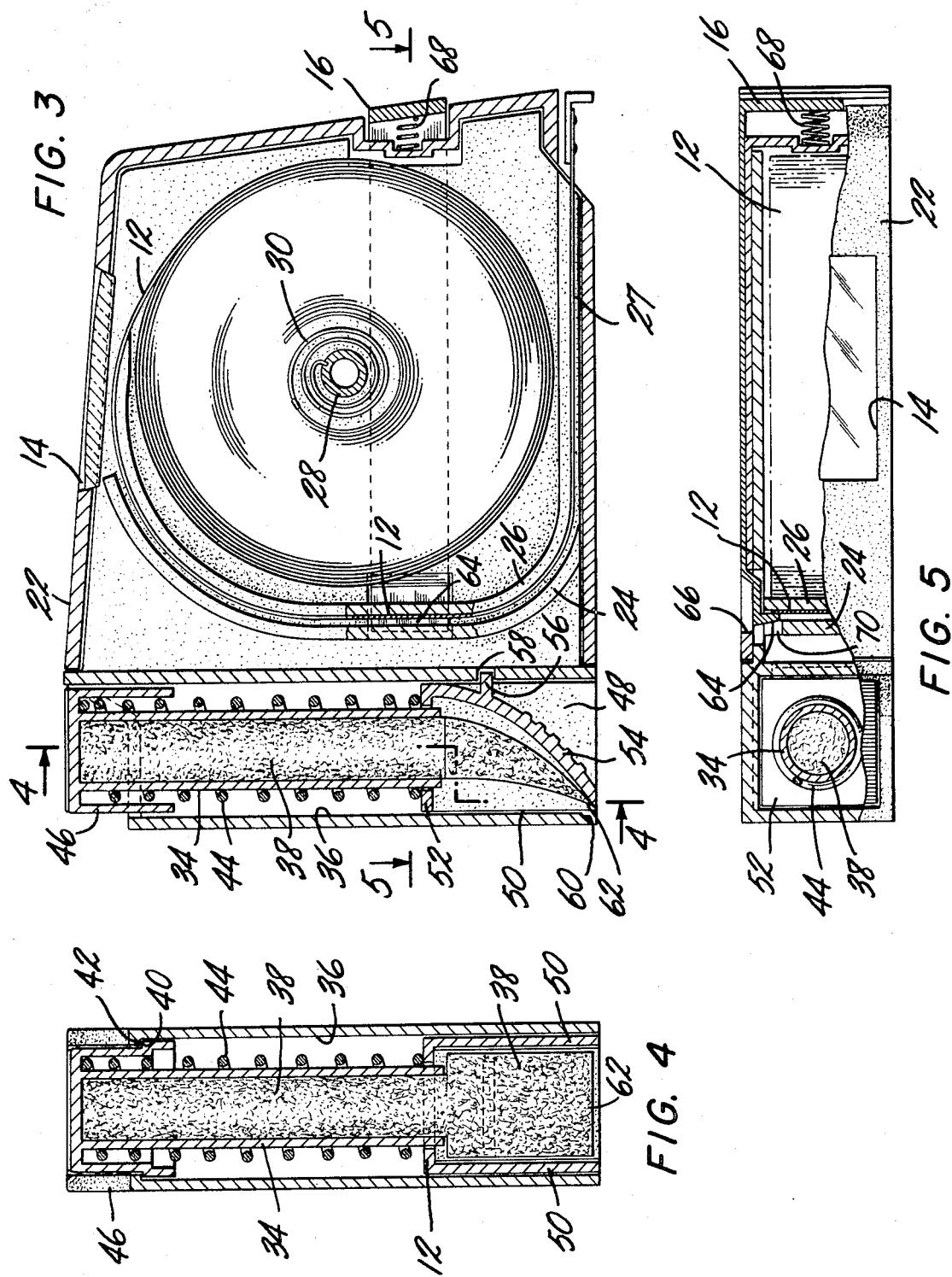

3,731,389

TAPE MEASURING DEVICE

BACKGROUND OF THE INVENTION

The prior art related to tape measuring devices discloses many modifications of casings, rewinding mechanisms, and other features of such devices, but it is usually necessary for a workman to use both hands in using a tape measuring device to make a measurement and to mark the location of that measurement. Furthermore, the rewinding mechanism in conventional tape measures is often difficult to operate, and the workman often must use both hands in effecting and rewinding operation. Accordingly, it is an object of this invention to provide a tape measuring device having a marker embodied therein for easy manipulation to accurately mark an article being measured. Furthermore, it is an object of this invention to provide a device for actuating an automatic rewinding mechanism for rewinding the tape measure which is withdrawn from the casing.

SUMMARY OF THE INVENTION

In accordance with one embodiment of the invention, I provide a casing for a coiled measuring tape having spring means at its center for automatically rewinding the coil within the casing after the tape measure has been withdrawn for use. A bearing surface is provided within the casing, and the outer loop of the tape measure is passed over the bearing surface which cooperates with a spring loaded gripping member for urging the outer loop against the bearing surface under normal conditions. This combination of gripping member and bearing surface provides a brake device, so that when the tape is withdrawn from the casing, it will remain in its withdrawn state until the brake mechanism is released, by moving the gripping members away from the bearing surface, to allow the spring mechanism to recoil the tape. The gripping member is connected to a surface externally of the casing which serves as a push-button, so that the brake ma be released by simply pressing the push-button to remove the gripping member from engagement with the tape.

The underside of the tape measure is marked in measuring increments for being read in a window disposed in the upper face of the casing. The marks on the underside of the tape are arranged to accurately indicate the distance from the outer end of the coiled tape to the end of the tape measuring casing which is opposite the end of the casing from which the tape is withdrawn. Thus, when the tape is completely wound within the casing, the reading at the window in the upper facing of the casing is the same as the longitudinal dimension of the base of the casing. Similarly, when the tape is withdrawn, for example, one inch from the casing, then the reading in the window is equal to one inch plus the longitudinal dimension on the base of the casing.

A marking device is connected to the casing at the end opposite that from which the tape is withdrawn, and said marking device is operable by means of a push-button to mark the exact location which corresponds to the reading at the window of the casing. The marking device comprises, for example, a felt tipped marker held within a cartridge which is inserted from the bottom face of the casing. The cartridge is removably retained within the casing by a resilient plug which is held in place within said bottom opening of the casing. The upper face of the cartridge forms a push button which is urged upwardly by a coiled spring disposed about the body cartridge between the underside of the upper face of the cartridge and the resilient plug. An opening is provided in the lower end face of the casing to allow the tip of the felt marker to project outwardly of the casing and to mark an article being measured, whereupon the coiled spring urges the marker to withdraw into the casing.

BRIEF DESCRIPTION OF THE DRAWINGS

The accompanying drawings illustrate one embodiment of the invention. In such drawings:

FIG. 1 is a perspective view of a tape measure device embodying the improvements of this invention;

FIG. 2 is an exploded view of the components which comprise the device shown in FIG. 1;

FIG. 3 is a sectional view of the device shown in FIG. 1;

FIG. 4 is a sectional view taken along the line 4—4 of FIG. 3 and showing, in particular, the details of the marking structure embodied in the invention;

FIG. 5 is a sectional view taken along the line 5—5 of FIG. 3 and showing details of the brake structure of one embodiment of the invention.

DETAILED DISCLOSURE OF THE PREFERRED EMBODIMENT

In one embodiment of the invention, as shown perspectively in FIG. 1, there is provided a casing 10 having a measuring tape 12 coiled therein for removal and recoiling through a tape access slot 13, the tape measure has measuring indicia thereon for being read through a window 14 in the upper face of the casing 10. The casing houses two push buttons, 16 and 18, for respectively actuating an automatic rewinding mechanism, and for actuating a marker which scribes a line at the point corresponding to the distance from the end of the tape as indicated on the tape 12 at the window 14.

As shown in FIGS. 2–5, the casing 10 is separable into various components comprising a chassis portion 20, a cover 22, and the push button 16. The chassis 20 is formed by a vertically disposed side wall 24 having a pair of curved plates 24 and 26 projecting internally and transversely therefrom, and extending from the tape access slot 13 to the window 14. The outermost coil 27 of the tape 12 is disposed between the two curved plates 24 and 26, so that the distance between the slot 13 and the window 14 is always constant. In this way, the dimensions being measured may be indicated with great accuracy. A spindle 28 also projects internally from the side wall, centrally thereof, to receive the coiled tape 12, which is connected to a spring return means of any conventional configuration as represented at reference numeral 30. The cover 22 slides over the side wall and curved plates to provide a housing therefor, and the cover is held in place by a screw which passes through an opening 32 in the housing and threads into the spindle 28.

A marking device comprising a cartridge 34 is disposed within a tubular portion 36 of the casing at the rearward end thereof. The cartridge is hollow and receives a felt marker 38, or the like, therewithin, and is received into the tubular portion 36 through an opening in the bottom of the casing. As shown in FIG. 4, the cap which forms the push-button 18 of the cartridge is provided with a shoulder 40 which engages a projecting portion 42 of a side wall of the tubular section of the housing so that the cartridge is held against upward removement from the tubular portion. A coil spring 44 is positioned on the cartridge, its upper end being disposed in a space defined by the cartridge wall and a depending flange 46 which is integral with the cap, and the lower end of the spring is held in place by a plug 48 which closes the opening in the tubular portion 36 and acts as a reaction surface for the spring, thereby urging it upwardly. The plug 48 is formed by a member having side walls 50 and an upper plate 52 having an opening therein for receiving the cartridge therethrough. A flexible member 54 depends from the upper plate 52 between the side walls 50 and is resiliently movable between said side walls. A lip 56 projects forwardly from the forward face of the flexible resilient member 54 for insertion in a slot 58 in the casing so that the plug is held in place until pressure is applied thereto to resiliently force it upwardly and rearwardly within the opening thereby releasing the lip 56 from the slot 58 and permitting the plug to be withdrawn from the tubular portion 36. The flexible member 54 is curved to terminate at its lower end at an opening 60 in the rearward lower portion of the tubular section so that the tip 62 of the marker is directed toward said opening 60 as the push button 18 is pressed downwardly against the force of the spring 44. Thus, when the push-button is pressed downwardly the tip 62 is moved from its retracted position to an operating position in which it makes a mark exactly even with the rear face of the casing, and when the push-button 18 is released it withdraws the marker back into the tubular section 36 to its retracted position corresponding to a rest position thereof.

The push button 16 comprises a U-shaped member having inwardly disposed fingers 64 at its free ends, said fingers extending through openings 66 in the side walls of the cover 22 for engaging the outer loop 27 of the measuring tape and pressing the tape against the plate 26 under the force of a spring 68 mounted between the cover 22 and the inner face of the connecting portion of the U-shaped push-button 16. Thus, the tape can be withdrawn from the casing, and maintained in the withdrawn state by the brake action of the projections which press the tape against the plate 26. Then, when the tape is to be recoiled within the housing, the push-button 16 is pressed inwardly against force of the spring 68, thereby moving the fingers 64 from their engagement with the tape and permitting the rewinding spring 30 to function to rewind the tape within the housing. Thus, the plate 24 is notched at its portion 70 adjacent the finger 64 so that the fingers can be displaced rearwardly within the casing when they are to be retracted from engagement with the plate.

In operation, it is seen that the brake mechanism, the guide walls 24 and 26, and the marker all combine and cooperate to provide a device which satisfies the various objects set forth above. That is, the inner plate 26 accurately defines the distance between the withdrawal portion of the casing and the reading window thereof, so that that distance can be accurately correlated with the indications on the tape and the rear face of the casing, at which point the marking device is actuable. Thus, said inner plate 26 combines with the marker to accurately indicate the measurement on the tape, and that inner plate combines with the brake mechanism to maintain the tape in a withdrawn position until the push button 16 is actuated to permit the rewinding device to recoil the tape.

What I claim is:

1. A measuring device comprising casing means, a coiled measuring tape disposed within said casing means and having measuring indicia thereon, a tape access slot in a forward wall of the casing means for permitting the withdrawal of said tape and the return thereof to its coiled state, means defining a window in said casing means for viewing the indicia on a coiled portion of said tape, manually operated marker means movably mounted on a rearward portion of said casing means and selectively operable to mark a surface being measured at a point in line with an outer surface of said rearward wall of said casing means, means movably mounting said marker means in an offset position relative to said surface of said rear wall for movement relative to said casing means from a retracted position to an operating position including means to guide said marker means from an offset position to mark said point and back to said retracted position corresponding to a rest position, wherein said point defines one end of a measured distance, the other end of said measured distance being defined by the free end of the tape, and comprising means wherein said distance measurement is indicated by the indicia on the tape at said window of the casing means.

2. A measuring device as set forth in claim 1, in which said casing means defines a tubular cavity in said rearward portion thereof, and said marking means comprises a cartridge disposed within said cavity and having a marking tip at its lower end and a push-button at its upper end, a plug mounted within a lower portion of said cavity for retaining said cartridge therein and defining a casing means opening with said rearward wall of said casing means, and a coil spring extending between said push-button and said plug to urge said cartridge upwardly within said cavity, whereby downward pressure on said push-button causes said marking tip to mark the article being measured.

3. A measuring device as set forth in claim 2, in which said push-button has a depending flange connected thereto and spaced outwardly from the sides of said cartridge, said flange and cartridge sides receiving the upper end of the coil spring therebetween, said flange having an outwardly projecting shoulder, and the casing having a ledge projecting inwardly of said cavity above said shoulder to block upward movement of said cartridge out of said cavity.

4. In a tape measuring device including a casing having a coiled measuring tape disposed therein and marked with measuring indicia, a tape access slot in an end wall thereof, a window through which the tape indicia can be read and spring means for automatically retracting the tape into the casing and winding the tape into a coil, the improvement which comprises a rigid, longitudinally curved plate mounted transversely within the casing and extending from the tape access slot to the casing window along a curved line outside of the circumference of the coiled tape and between the outermost loop of the coiled tape and the remainder thereof to define a specific length of tape along the extent of said plate from the access slot to the window, marker means movably disposed within the casing at the opposite end thereof from the access slot, said marker means including a marking element and means for guiding movement of said marking element with respect to said casing and into engagement with an article being measured with the tape measuring device.

5. A measuring device as set forth in claim 3, further comprising walls defining a tubular cavity in the casing for receiving said marker means, in which said marking element comprises a cartridge disposed within said cavity and having a marking tip at its lower end and a push-button at its upper end, a plug mounted within a lower portion of said cavity for retaining said cartridge therein and defining an opening at a rearward wall of said casing, and a coil spring extending between said push-button and said plug to urge said cartridge upwardly within said cavity, whereby downward pressure on said push-button causes said marking tip to mark the article being measured.

6. A measuring device as set forth in claim 5, in which said push-button has a depending flange connected thereto and spaced outwardly from the sides of said cartridge, said flange and cartridge sides receiving the upper end of the coil spring therebetween, said flange having an outwardly projecting shoulder, and the casing having a ledge projecting inwardly of said cavity above said shoulder to block upward movement of said cartridge out of said cavity.

7. In a measuring device including a casing having a coiled measuring tape disposed therein and marked with measuring indicia, a tape access slot in an end wall thereof, and spring means for automatically retracting the tape into the casing and winding the tape into a coil, the improvement which comprises a rigid, longitudinally curved plate mounted transversely within the casing and extending from the tape access slot to an upper portion of the casing along a curved line outside the circumference of the coiled tape and between the outermost loop of the coiled tape and the remainder thereof, and further comprising brake means including pressure fingers and means for springably urging said pressure fingers toward said plate to grasp the outer loop of the tape between the pressure fingers and plate to prevent rewinding of the tape by the spring actuated return device, and manually operable means for urging said pressure fingers away from the outer loop of the tape to allow the tape to rewind.

8. A measuring device as set forth in claim 7, in which the casing includes side walls having opposed openings and in which said brake means comprises a U-shaped element having two spaced parallel arms and a connecting arm joining said parallel arms, and having two said pressure fingers mounted respectively on the free ends of said parallel arms and inwardly directed in a face-to-face relation, said U-shaped element disposed with said parallel arms lying adjacent the sides of the casing and said fingers being received through said opposed openings in the casing for preventing movement of the tape by pressing it against the plate, wherein said means for urging said pressure fingers toward said plate comprises a coil spring held between the casing and an inner face of said connecting arm, and wherein said manually operable means for urging said pressure fingers away from the tape comprises said U-shaped element whereby manually applied pressure against the outer face of said connecting arm is coupled to said fingers through said parallel arms to remove said fingers for engagement with the tape.

9. A measuring device as set forth in claim 7, in which said casing includes a window through which said tape indicia can be read, and in which said curved plate defines a specific predetermined length of tape from said access slot to said window.

10. In a tape measuring device including a casing having a coiled measuring tape disposed therein, a tape dispensing opening in an end wall thereof, and spring means for automatically drawing the tape into the casing and winding the tape into a coil, the improvement comprising, brake means including a rigid plate mounted transversely within the casing at a position outside an area required for the coiled tape and between the outermost loop of the coiled tape and the remainder thereof; said casing including side walls having a pair of opposed openings therein; a U-shaped element having two spaced parallel arms and a connecting arm joining said parallel arms, and having two pressure fingers mounted respectively on the free ends of said arms and inwardly directed, said U-shaped element disposed with said parallel arms lying adjacent the side walls of the casing, and said fingers being received through said opposed openings in the casing for preventing movement of the tape by pressing it against the plate; a coil spring held between the casing and the inner face of said connecting arm; and manually operable means for urging said pressure fingers away from the tape, said manually operable means comprising said U-shaped element, whereby manually applied pressure against the outer face of said connecting arm is coupled to said fingers through said parallel arms to remove said fingers from engagement with the tape.

11. In a tape measuring device including a casing having a coiled measuring tape disposed therein and marked with measuring indicia, a tape access slot in an end wall thereof, and spring means for automatically retracting the tape into the casing and winding the tape into a coil, the improvement which comprises manually operated marking means, wherein said casing defines a tubular cavity in a rearward portion thereof and said marking means includes a cartridge disposed within said cavity and having a marking tip at its lower end and a push-button at its upper end, a plug mounted within a lower portion of said cavity for retaining said cartridge therein and defining a casing opening with said rearward wall of said casing, and a coil spring extending between said push-button and said plug to urge said cartridge upwardly within said cavity, whereby downward pressure on said push-button causes said marking tip to mark the article being measured at a point aligned with said rearward wall of said casing.

12. A measuring device as set forth in claim 11, in which said push-button has a depending flange connected thereto and spaced outwardly from the sides of said cartridge, said flange and cartridge sides receiving the upper end of the coil spring therebetween, said flange having an outwardly projecting shoulder, and the casing having a ledge projecting inwardly of said cavity above said shoulder to block upward movement of said cartridge out of said cavity.

13. A measuring device as set forth in claim 11, in which said plug includes a rearwardly and downwardly inclined member disposed within said cavity for guiding said marking tip toward said casing opening between said plug and said rearward wall of said casing.

* * * * *